United States Patent
Acuna et al.

(10) Patent No.: US 10,296,858 B2
(45) Date of Patent: May 21, 2019

(54) INVENTORY-BASED WAREHOUSE ALLOCATION FOR RETAIL ITEMS

(71) Applicant: ORACLE INTERNATIONAL CORPORATION, Redwood Shores, CA (US)

(72) Inventors: Fernando Acuna, Pompano Beach, FL (US); Mark Schwans, Rosemount, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 945 days.

(21) Appl. No.: 14/626,956

(22) Filed: Feb. 20, 2015

(65) Prior Publication Data

US 2016/0247108 A1 Aug. 25, 2016

(51) Int. Cl.
*G06Q 10/06* (2012.01)
*G06Q 10/08* (2012.01)
*G06Q 30/06* (2012.01)

(52) U.S. Cl.
CPC ..... *G06Q 10/06315* (2013.01); *G06Q 10/087* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 8,781,882 B1* | 7/2014 | Arboletti | ............ | G06Q 10/0639 705/7.11 |
| 2007/0136079 A1* | 6/2007 | Beykirch | ............... | G06Q 10/08 705/338 |
| 2009/0094087 A1* | 4/2009 | Chung | ................. | G06Q 10/063 705/7.11 |
| 2011/0022534 A1* | 1/2011 | Amling | .................. | G06Q 10/08 705/333 |
| 2015/0168947 A1* | 6/2015 | Ireland | ............. | G06Q 10/06315 700/100 |

* cited by examiner

*Primary Examiner* — Thomas L Mansfield
(74) *Attorney, Agent, or Firm* — Kraguljac Law Group, LLC

(57) ABSTRACT

Systems, methods, and other embodiments associated with allocation of retail goods in a warehouse to warehouse transfer based on warehouse inventory data are described. In one embodiment, a method includes receiving a request for allocation of a quantity of an item sold in multiple types, where the quantity of items is to be transferred from a source warehouse to a destination warehouse. An allocation method is selected from a plurality of allocation methods. Each allocation method specifies a subset of warehouse inventory data to be used to generate allocation ratios. The method includes reading the subset warehouse inventory data specified by the selected allocation method; generating allocation ratios by determining a contribution of each of the multiple types to the subset of warehouse inventory data; and generating allocation quantities for each respective type in the multiple types by applying the respective allocation ratios to the quantity.

20 Claims, 6 Drawing Sheets

INVENTORY-BASED WAREHOUSE ALLOCATION FOR RETAIL ITEMS

BACKGROUND

As the selling season for fashion items progresses from planning to clearance, fashion items are often transferred between warehouses to meet the needs of stores. Each fashion item typically includes multiple Stock Keeping Units (SKUs). For example if the item is a blouse, the SKUs are the specific color and size combinations for the blouse, such as a medium white blouse or a small black blouse. Transferring the correct combinations of SKUs from one warehouse location to another helps to ensure the receiving warehouse location is sent a variety of sizes to meet the demand of the selling store locations which it servers, which in turn helps to maximize profits and reduce markdown liabilities at the store level.

A "size profile" is a distribution or collection of ratios that express the contribution of each of an item's multiple types or SKUs within a total quantity of the item. While the term "size profile" will be used throughout this description and examples will be in a fashion context, the systems and methods herein are also suitable for use in any industry in which multiple types or SKUs are present for a given item and stores sell different distributions of the types or SKUs (e.g., upholstery color for furniture might be sold according to a color profile, flavors of ice cream according to a flavor profile, and so on).

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

One factor that impacts the optimum combination of SKUs to ship between warehouses is that different warehouses service different stores that sell different distributions of SKUs for a given item. Thus, each warehouse has a "size profile" for the items it ships. In some situations, it is advantageous to use a destination warehouse's size profile (based on the destination warehouse's shipment history) when allocating items in a transfer from a source warehouse to the destination warehouse. In other situations, such as at the beginning of the selling season when the warehouse may not yet have shipped many items, it may be advantageous to allocate items in a transfer based on "percent to total" ratios of the various SKUs to the total quantity of the item available at the source warehouse.

Existing allocation solutions require manual entry of the allocation quantities of each SKU in a warehouse to warehouse transfer. This requires that the planner perform allocation related calculations by hand and enter quantities on a per SKU basis, which can be time consuming. The systems, tools, and methods described herein access warehouse inventory data and, based on the inventory data, generate allocation ratios for each SKU in an item being transferred. These allocation ratios are applied to a total transfer quantity to automatically generate allocation quantities for the transfer between warehouses. The allocation ratios can be conceptualized as a "size profile" to be used for the warehouse transfer. The size profile can be based on inventory data for the source warehouse and/or the destination warehouse.

In some embodiments, an allocation method can be selected for use in the automatic allocation process. Example allocation methods include percent to total and historical. The percent to total allocation method is based on source warehouse availability for the item. The historical allocation method is based on a history of shipments of the item out of the destination warehouse. Allowing selection of an allocation method greatly improves the flexibility that can be provided by the automatic allocation process. By accessing warehouse inventory data in real time, the systems, tools, and methods described herein can generate allocation quantities on demand.

Figure 1:
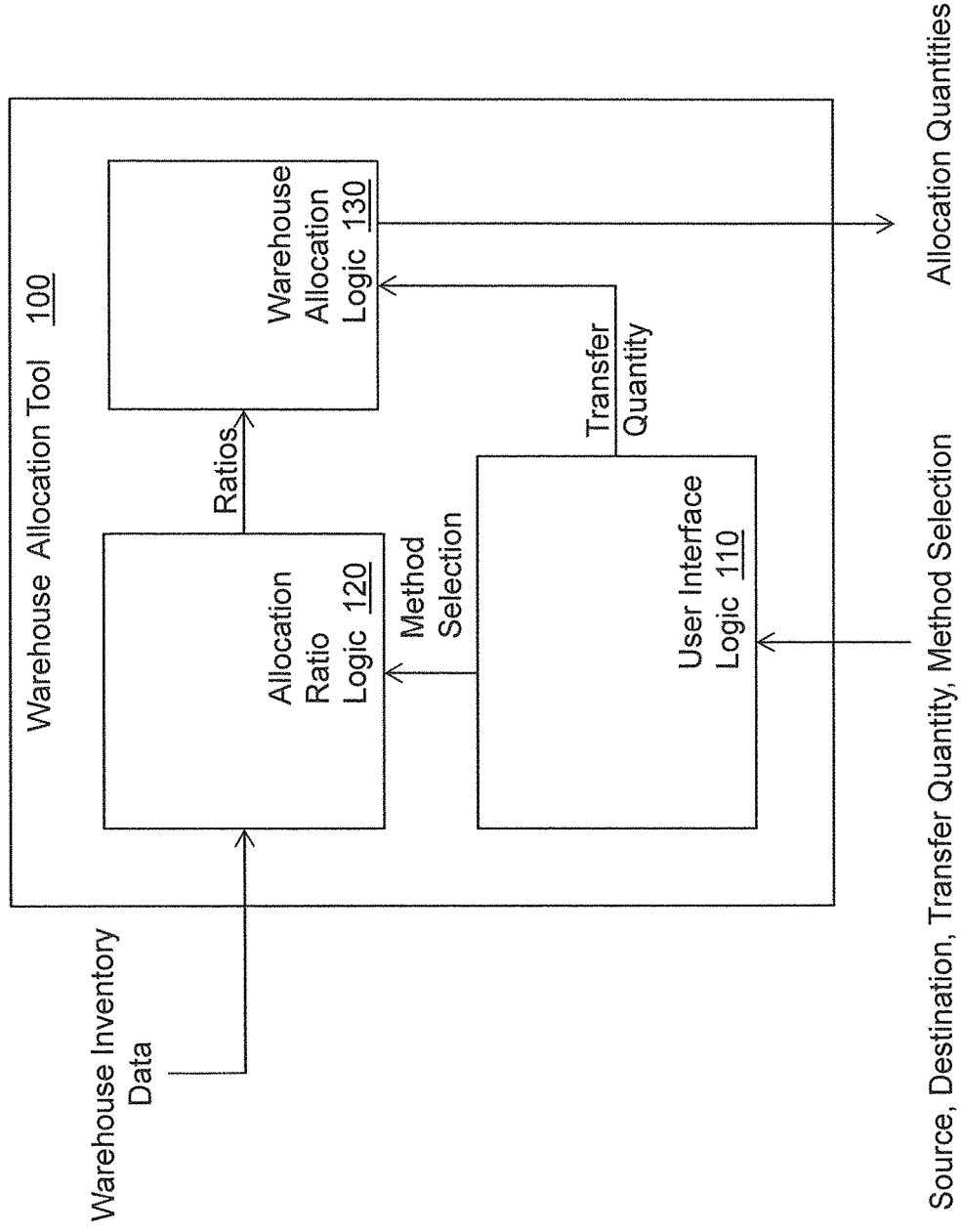
FIG. 1 illustrates one embodiment of a warehouse allocation tool that allocates retail goods for transfer between warehouses based on warehouse inventory data.

With reference to FIG. 1, one embodiment of a warehouse allocation tool 100 that performs allocation of retail items being transferred between warehouses is illustrated. The warehouse allocation tool 100 is configured to be used in conjunction with a computer processor (not shown) and the warehouse allocation tool 100 causes the processor to perform various allocation-related actions. The multiple logics of the warehouse allocation tool 100 may be implemented as an ASIC or computer-executable instructions stored on a non-transitory computer storage medium that is installed in or otherwise read by the processor.

The warehouse allocation tool 100 has access to warehouse inventory data. In one embodiment the warehouse inventory data is maintained by a database system that records inventory data in real time to accurately reflect the flow of items through each warehouse. The warehouse inventory database stores inventory data in electronic form, such as tables. For example, the warehouse inventory data may be an ITEM_LOC_HIST table maintained by Oracle Retail Merchandising System (RMS). By accessing this up-to-date inventory information directly, the warehouse allocation tool 100 can provide appropriate allocation quantities on demand.

To allocate an item for a warehouse transfer, the warehouse allocation tool 100 inputs a source warehouse or warehouses, a destination warehouse, a total quantity of an item to be transferred (hereinafter "transfer quantity"), and an allocation method selection. The inputs may be provided by a planner or a supply chain management software product. The warehouse allocation tool 100 outputs allocation quantities for the item that takes into consideration warehouse inventory data and the selected allocation method.

The warehouse allocation tool 100 includes user interface logic 110, allocation ratio logic 120, and warehouse allocation logic 130. When the allocation process begins, the user interface logic 110 receives a request for allocation for a warehouse transfer. The user interface logic 110 is configured to prompt the requester for a source warehouse or warehouses, a destination warehouse, a transfer quantity, and an allocation method selection. The user interface logic 110 passes the allocation method selection and the source and destination warehouses to the allocation ratio logic 120.

The allocation ratio logic 120 calculates allocation ratios for use in allocating the transfer quantity of items. The allocation ratios can be conceptualized as the "size profile" to be used in the allocation. The allocation method specifies which warehouse inventory data is to be used by the allocation ratio logic 120 to generate the allocation ratios. As will be described in more detail with respect to FIGS. 3-5, when the selected allocation method is "percent to total" the warehouse inventory data for the source warehouse is accessed to determine the source warehouse's available inventory for the item being transferred. When the selected allocation method is "historical" the warehouse inventory data for shipments of the item out of the destination warehouse is accessed.

The allocation ratio logic 120 generates the allocation ratios by determining a contribution of each of the multiple SKUs for the item to the selected warehouse inventory data (i.e., either the source warehouse or destination warehouse inventory data for the item depending on which allocation method has been selected). The allocation ratio logic 120 passes the ratios to the warehouse allocation logic 130. The warehouse allocation logic 130 generates allocation quantities for each respective SKU in the multiple SKUs by applying the respective ratios to the transfer quantity. The warehouse allocation logic 1302 provides the allocation quantities to the requester.

Figure 2:
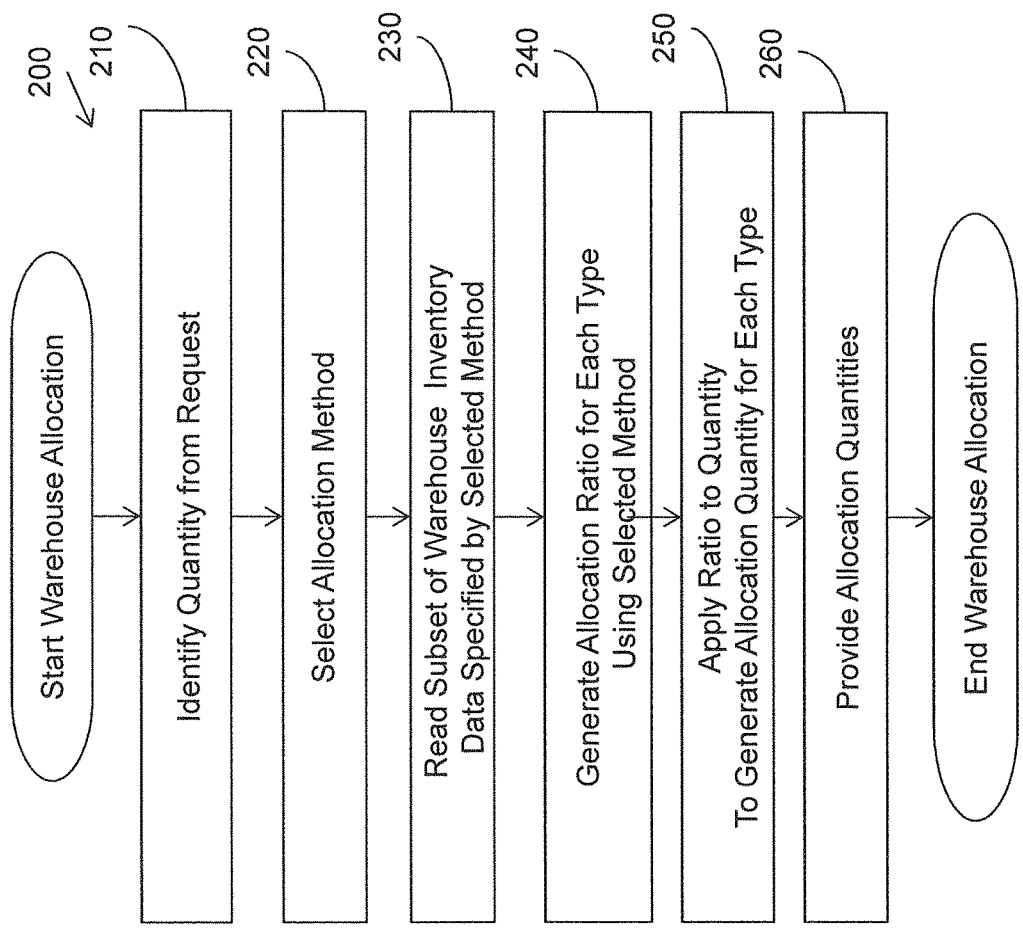
FIG. 2 illustrates an example embodiment of a method associated with allocation of a warehouse to warehouse transfer of items based on warehouse inventory data.

FIG. 2 illustrates one example embodiment of a method 200 for performing warehouse transfer allocation based on warehouse inventory. In one embodiment, the method 200 is performed by the warehouse allocation tool 100 of FIG. 1. The method includes, at 210, in response to a request for allocation, identifying a quantity of an item sold in multiple types from the request. In one embodiment, the request is received from a user by way of the user interface logic 110 (FIG. 1). In other embodiments, the request is received from a different computing device, possibly a separate computing system that processes allocations as opposed to storing and managing warehouse inventory data. The request may be parsed or otherwise processed to identify the quantity of items to be allocated.

The method includes, at 620, selecting an allocation method from a plurality of allocation methods. As described above, each allocation method in the plurality of allocation methods specifies a subset of warehouse inventory data to be used to generate allocation ratios (e.g., either source warehouse availability data or destination historical shipment data). At 630, the method includes reading the subset of warehouse inventory data specified by the selected allocation method. In one embodiment, an electronic data structure that stores the subset of warehouse inventory data specified by the selected allocation method is read and the subset of data is retrieved.

At 640, the method includes generating an allocation ratio by determining a contribution of each type to the subset of warehouse inventory and at 650, generating an allocation quantity for the type by applying the allocation ratio to the quantity from the request. The method includes, at 660, providing the allocation quantities in response to the request for allocation. In one embodiment, the allocation quantities are displayed to the user by the user interface logic 110 interacting with a computer display or monitor. In another embodiment, the allocation quantities are transmitted to another computing device that is going to perform the actual allocation of items. In another embodiment, the allocation quantities and/or allocation ratios are stored in an electronic data structure for later access for allocation purposes.

Figure 3:
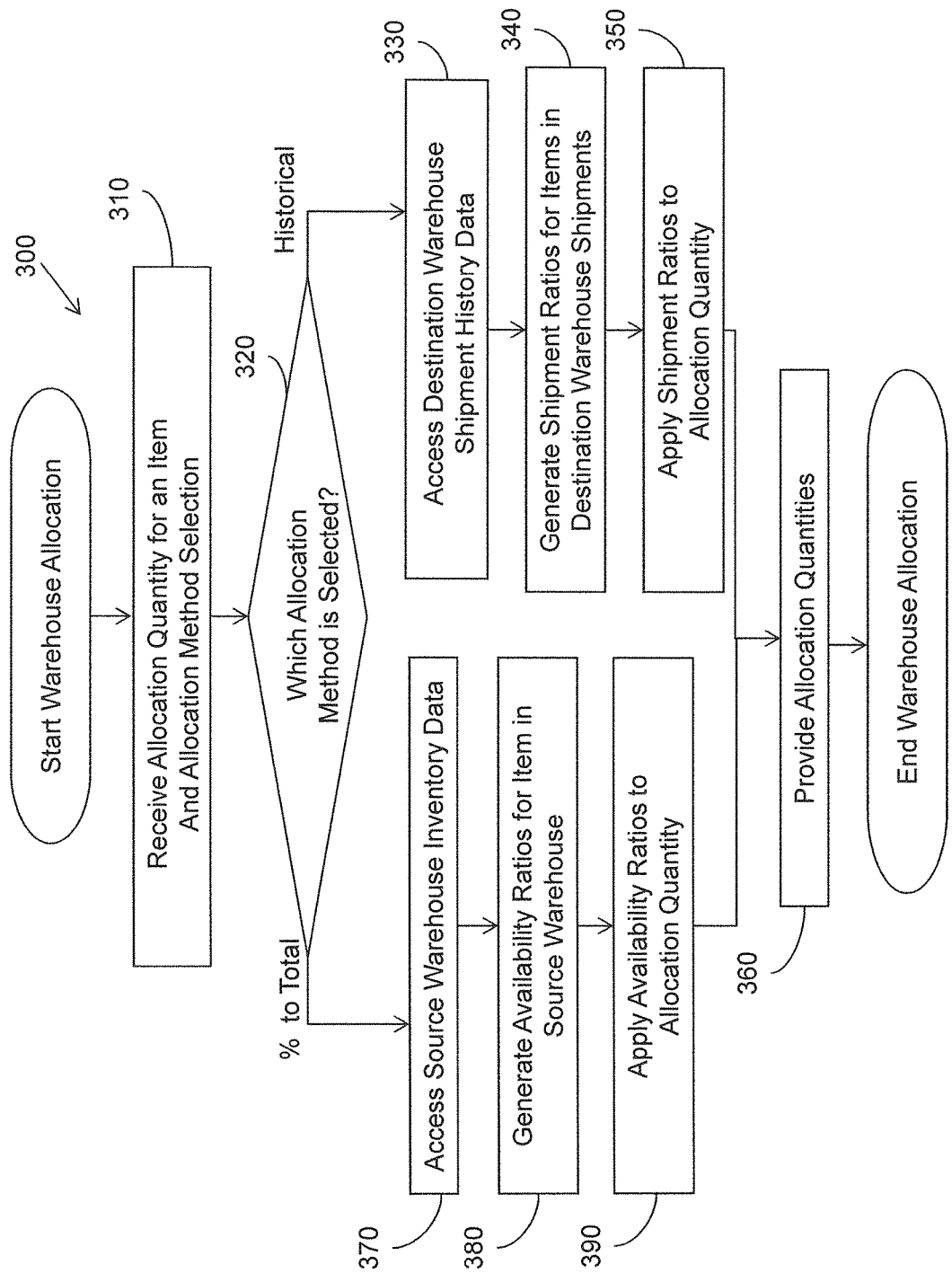
FIG. 3 extends FIG. 2 and is an example embodiment of a method associated with allocation of a warehouse to warehouse transfer using different allocation methods.

FIG. 3 illustrates one example embodiment of a method 300 for performing warehouse transfer allocation based on warehouse inventory when there are two possible allocation methods. In one embodiment, the method 300 is performed by the warehouse allocation tool 100 of FIG. 1. The method includes, at 310, receiving a request for allocation of a quantity of an item sold in multiple SKUs. The quantity of items is to be transferred from a source warehouse to a destination warehouse. At 320, the method includes receiving an allocation method selection. If the selected allocation method is historical, then steps 330-360 are performed. If the selected allocation method is percent to total, then steps 370-390 and 360 are performed.

When the selected allocation method is historical, at 330 the method includes accessing inventory data that records shipments of the item from the destination warehouse. At 340, the method includes generating shipment ratios for the item by determining a contribution of each of the multiple SKUs to the inventory data for the destination warehouse. At 350, the method includes generating the allocation quantities by applying the shipment ratios to the quantity. At 360, the method includes providing the allocation quantities to the requester.

When the selected allocation method is percent to total, at 370 the method includes accessing inventory data that represents the availability of the item in the source warehouse. At 380, the method includes generating availability ratios for the item by determining a contribution of each of the multiple SKUs to the inventory data for the source warehouse. At 390, the method includes generating the allocation quantities by applying the availability ratios to the transfer quantity. At 360, the method includes providing the allocation quantities to the requester.

Warehouse inventory data for a given warehouse may include items that have been purchased (e.g., by purchase order) or are otherwise destined for the warehouse as well as items that are physically present in the warehouse and have not been allocated for a different shipment (e.g., stock on hand). In one embodiment, the requester is able to select which inventory status should be considered as "available" for the purposes of allocation (e.g., only stock on hand in the source warehouse and/or include items on purchase order for source warehouse). In this embodiment, the method 300 includes receiving a source selection that selects one or more item inventory statuses; filtering the inventory data based on the source selection; and generating the availability ratios by determining a contribution of each of the multiple SKUs to the filtered inventory data in the source warehouse.

Figure 4:
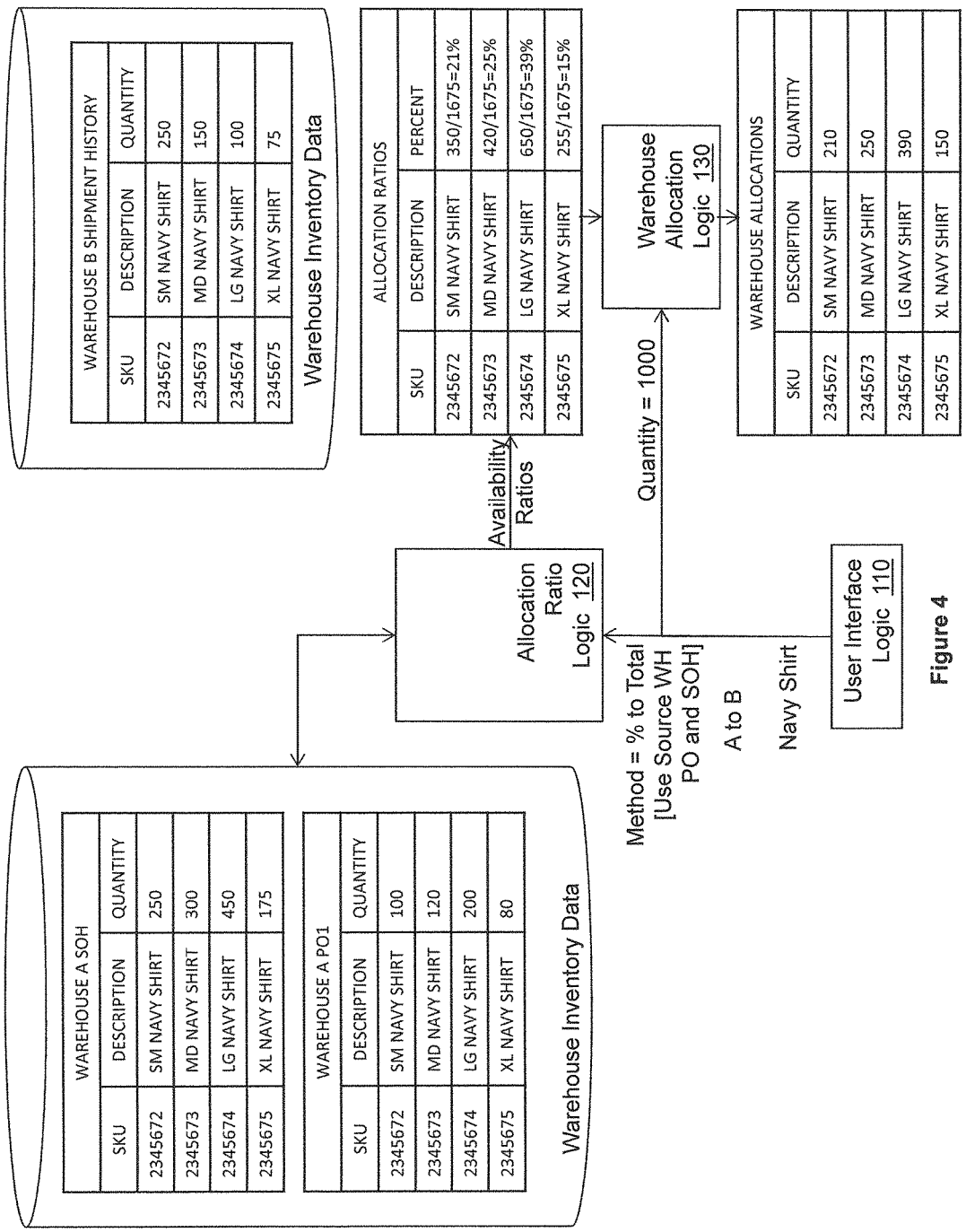
FIGS. 4 and 5 illustrate an example of fashion retail items being allocated by the system of FIG. 1 using two different allocation methods.
Figure 5:
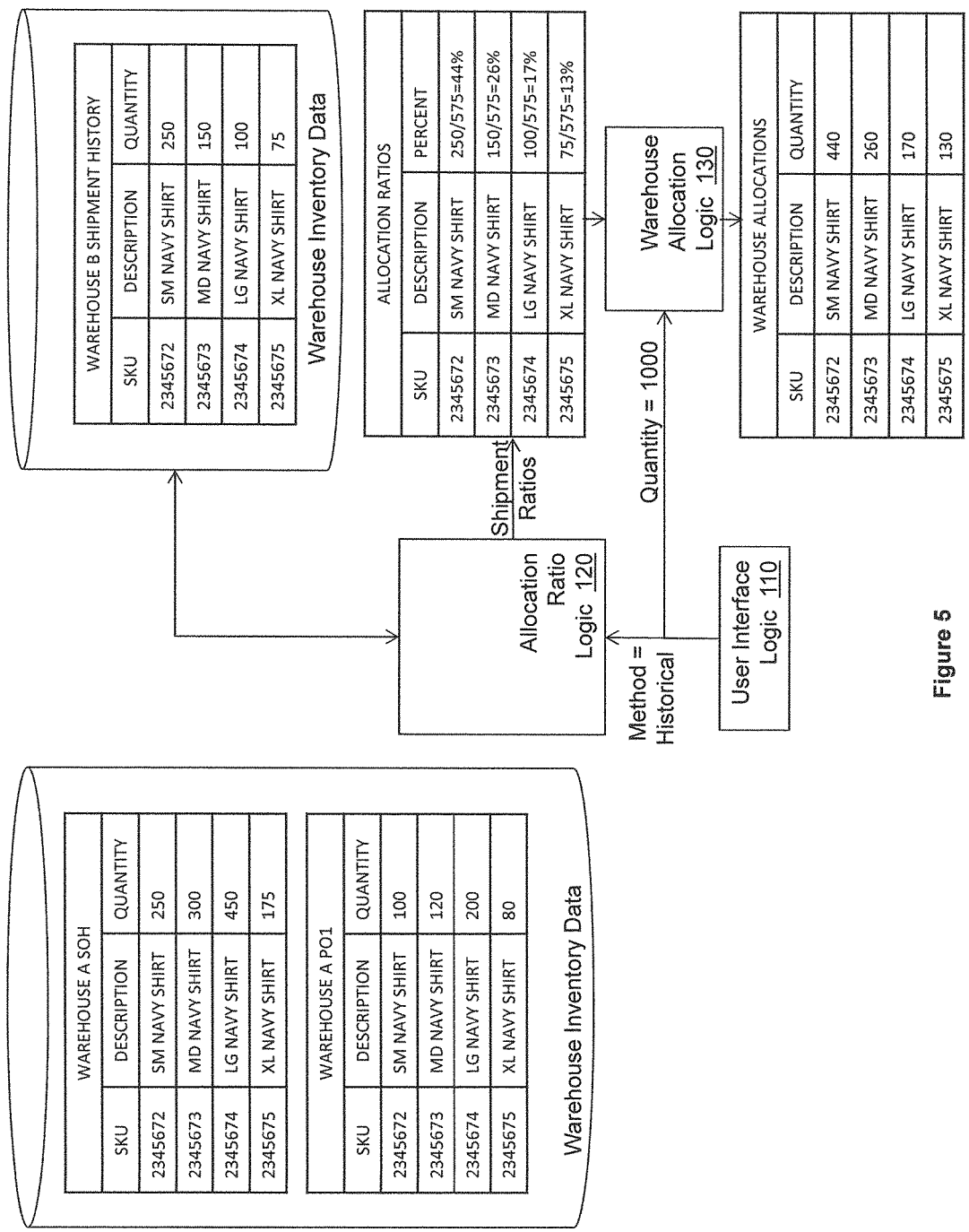

FIGS. 4 and 5 illustrate an example of one embodiment of the warehouse allocation tool 100 of FIG. 1 in operation to allocate items being transferred from warehouse A to warehouse B. While the warehouse allocation tool 100 is not shown in FIGS. 4 and 5, the user interface logic 110, the allocation ratio logic 120, and the warehouse allocation logic 130 are shown. Warehouse inventory data is shown for the source warehouse A and the destination warehouse B. Other inventory data would be stored for warehouses A and B, which is omitted from the Figures for clarity sake. For example, shipment history data for warehouse A would also be stored in the warehouse inventory data. Inventory data for many items in addition to the navy shirts in FIGS. 4 and 5 would be stored, in electronic form, for the warehouses.

In FIG. 4, the user interface logic 110 receives a request to allocate 1000 navy shirts using the percent to total allocation method. The user interface logic 110 passes the identity of the item, the selected allocation method, and the source and destination warehouse identities to the allocation ratio logic 120. Because percent to total allocation has been selected, the requester also provides a selection for which item statuses should be considered as available by the allocation ratio logic 120. The requester has specified that both stock on hand (SOH) and purchase order (PO) items should be considered available for allocation ratio purposes.

Because percent to total allocation has been selected, the allocation ratio logic 120 accesses inventory for the source warehouse A and not for the destination warehouse B. The inventory for source warehouse A includes SOH inventory and PO inventory. The SOH inventory indicates that 1175 navy shirts are physically present in warehouse A that have not already allocated for a different shipment. A purchase order PO1 has been entered into the warehouse inventory data that indicates that 500 navy shirts have been purchased from a supplier and are destined for warehouse A.

The allocation ratio logic 120 generates availability ratios for each SKU by determining the contribution of each SKU (in this case, each size is a different SKU) to the total number of shirts available in warehouse A. Based on the requester's designation, the allocation logic 120 treats both stock on hand items (1175 navy shirts) and purchase order items (500 navy shirts) as available. Thus, the allocation ratio logic 120 will calculate the contribution of each SKU to a total of 1675 available navy shirts. If only stock on hand had been selected, the allocation ratio logic 120 would only access the SOH data and calculate the contribution of each SKU to a total of 1175 available navy shirts.

The availability ratios generated by the allocation ratio logic 120 are shown in FIG. 4. For SKU 2345672 or size small, an availability ratio of (250+100)/1675 or 21% is determined. For SKU 2345673 or size medium, an availability ratio of (300+120)/1675 or 25% is determined. For SKU 2345674 or size large, an availability ratio of (450+200)/1675 or 39% is determined. For SKU 2345675 or size extra large, an availability ratio of (175+80)/1675 or 15% is determined.

The warehouse allocation logic 130 applies the availability ratios to the transfer quantity of 1000 to generate the allocation quantities shown in FIG. 4. 21% of 1000 or 210 small navy shirts are allocated, 25% of 1000 or 250 medium navy shirts are allocated, 39% of 1000 or 390 large navy shirts are allocated, and 15% of 1000 or 150 extra large navy shirts are allocated. These allocation quantities are returned to the requester.

In FIG. 5, the user interface logic 110 receives a request to allocate 1000 navy shirts using the historical allocation method. The user interface logic 110 passes the identity of the item, the selected allocation method, and the source and destination warehouse identities to the allocation ratio logic 120.

Because historical allocation has been selected, the allocation ratio logic 120 accesses inventory for the destination warehouse B and not for the source warehouse A. The shipment history inventory data for destination warehouse B indicates that 575 navy shirts have been shipped from warehouse B. The allocation ratio logic 120 generates shipment ratios for each SKU by determining the contribution of each SKU (in this case, each size is a different SKU) to the total number of navy shirts that have been shipped from warehouse B. Thus, the allocation ratio logic 120 will calculate the contribution of each SKU to the 575 navy shirts that have been shipped from warehouse B.

The shipment ratios generated by the allocation ratio logic 120 are shown in FIG. 5. For SKU 2345672 or size small, a shipment ratio of 250/575 or 44% is determined. For SKU 2345673 or size medium, a shipment ratio of 150/575 or 26% is determined. For SKU 2345674 or size large, a shipment ratio of 100/575 or 17% is determined. For SKU 2345675 or size extra large, a shipment ratio of 75/575 or 13% is determined.

The warehouse allocation logic 130 applies the shipment ratios to the transfer quantity of 1000 to generate the allocation quantities shown in FIG. 5. 44% of 1000 or 440 small navy shirts are allocated, 26% of 1000 or 260 medium navy shirts are allocated, 17% of 1000 or 170 large navy shirts are allocated, and 13% of 1000 or 130 extra large navy shirts are allocated. These allocation quantities are returned to the requester.

Note the difference in the allocation quantities produced by the different allocation methods in FIGS. 4 and 5. For example, far fewer small shirts are allocated by the percent to total method than the historical method. This may indicate that, to date, the demand for small navy shirts in stores supported by warehouse B has exceeded the planned demand, possibly because the shirts run large or many teenagers shop in those stores. Using the "historical" allocation method allows the transfer of shirts to warehouse B to better prepare warehouse B to support its particular stores.

As can be seen from the foregoing description, the tools, systems, and methods described herein access electronically stored warehouse inventory data to allocate retail items being transferred between warehouses. This allows for on demand allocation of warehouse to warehouse transfers based on available stock or historical shipments, as desired.

Computer Embodiment

Figure 6:
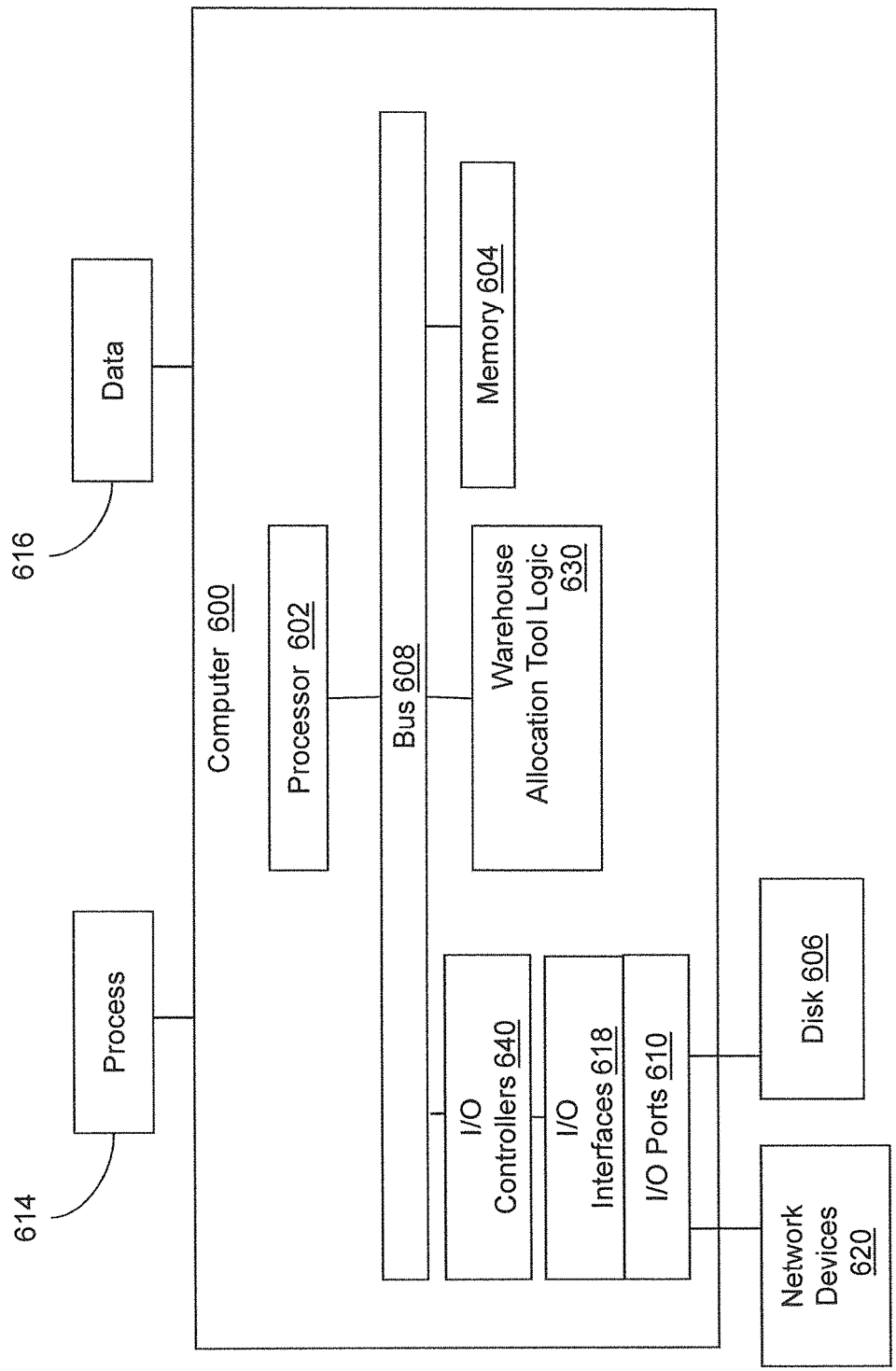
FIG. 6 illustrates an embodiment of a computing system in which example systems and methods, and equivalents, may operate.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include application tool logic 630 configured to facilitate allocating retail goods in the manner similar to the allocation tool 100 of FIG. 1 and/or the methods 200, 300 of FIGS. 2 and 3 and the examples of FIGS. 4 and 5. In different examples, the warehouse allocation tool logic 630 may be implemented in hardware, a non-transitory computer-readable medium with stored instructions, firmware, and/or combinations thereof. While the warehouse allocation tool logic 630 is illustrated as a hardware component attached to the bus 608, it is to be appreciated that in one example, the warehouse allocation tool logic 630 could be implemented in the processor 602.

In one embodiment, logic 630 or the computer is a means (e.g., hardware, non-transitory computer-readable medium, firmware) for allocating retail goods in a warehouse to warehouse transfer based on warehouse inventory data.

The means may be implemented, for example, as an ASIC programmed to allocate retail goods in a warehouse to warehouse transfer based on warehouse inventory data. The means may also be implemented as stored computer executable instructions that are presented to computer 600 as data 616 that are temporarily stored in memory 604 and then executed by processor 602.

Warehouse allocation tool logic 630 may also provide means (e.g., hardware, non-transitory computer-readable medium that stores executable instructions, firmware) for performing the method 200 of FIG. 2, the method 300 of FIG. 3, and/or the allocation technique exemplified in FIGS. 4 and 5.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

An "electronic data structure", as used herein, is an organization of data in a computing system that is stored in a memory, a storage device, or other computerized system. An electronic data structure may be any one of, for example, a data field, a data file, a data array, a data record, a database, a data table, a graph, a tree, a linked list, and so on. An electronic data structure may be formed from and contain many other data structures (e.g., a database includes many data records). Other examples of electronic data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic components may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, other equivalent logics may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if a greater speed is a primary consideration, then hardware would be selected. If a lower price is a primary consideration, then stored instructions/application would be selected for implementation. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer cause the computer to perform corresponding functions, the functions comprising:
    in response to receiving a request for reallocation of an item from a source warehouse to a destination warehouse, automatically parsing the request to identify a quantity of the item from the request, where the item is sold in multiple types;
    selecting an allocation method from either of
        (i) a percent to total allocation method, wherein the percent to total allocation method specifies reading a subset of warehouse inventory data that represents an availability of the item in the source warehouse, and
        (ii) a historical allocation method, wherein the historical allocation method specifies reading a subset of warehouse inventory data that records shipments of the item from the destination warehouse;
    reading, from a data structure, the subset of warehouse inventory data specified by the selected allocation method;
    for each type in the multiple types:
        i) generating an allocation ratio by determining a contribution of the type to the subset of warehouse inventory data specified by the selected allocation method;
        ii) generating an allocation quantity by applying the allocation ratio to the quantity of the item from the request; and
    controlling reallocation of the item from the source warehouse to the destination warehouse based on the allocation quantity for each of the multiple types, where the controlling comprises:
        transmitting an electronic communication to cause (i) allocation of a first quantity of a first type of the multiple types to a shipment based on a first allocation quantity specified for the first type of the item and (ii) allocation of a second quantity of a second type of the multiple types to the shipment based on a second allocation quantity specified for the second type of the item.

2. The non-transitory computer storage medium of claim 1, where the item is sold in multiple stock keeping units (SKUs) corresponding to size and color combinations and where each unique SKU corresponds to a unique type.

3. The non-transitory computer storage medium of claim 1 when the selected allocation method comprises percent to total, wherein:
    generating the allocation ratio comprises for each type in the multiple types: generating an availability ratio for the type by determining a contribution of each of the multiple types to the subset of warehouse inventory data that represents the availability of the item in the source warehouse, and generating the allocation quantity comprises generating the allocation quantity for the type by applying the availability ratio for the type to the quantity of the item from the request.

4. The non-transitory computer storage medium of claim 3, where:

the functions further comprise:

inputting a source selection that selects one or more item inventory statuses; and filtering the subset of warehouse inventory data that represents the availability of the item in the source warehouse based on the source selection, and generating the availability ratio comprises generating the availability ratio by determining a contribution of each of the multiple types to the filtered subset of warehouse inventory data that represents the availability of the item in the source warehouse.

5. The non-transitory computer storage medium of claim 4, where the item inventory statuses include one or more of stock on hand or-receipt pending based on a purchase order.

6. The non-transitory computer storage medium of claim 1 when the selected allocation method comprises historical, wherein:

generating the allocation ratio comprises generating a shipment ratio for the type by determining a contribution of the type to the subset of warehouse inventory data that records shipments of the item from the destination warehouse, and generating the allocation quantity comprises generating the allocation quantity for the type by applying the shipment ratio for the type to the quantity of the item from the request.

7. The non-transitory computer storage medium of claim 1, where reading the subset of warehouse inventory data comprises reading, in real time, the subset of warehouse inventory data specified by the selected allocation method to provide the allocation quantities on demand.

8. A computing system, comprising:

a processor; and memory storing instructions executable by the processor to cause the processor to perform operations comprising:

in response to receiving a request for reallocation of an item from a source warehouse to a destination warehouse, automatically parsing the request to identify a quantity of the item from the request, where the item is sold in multiple types;

selecting an allocation method from either of (i) a percent to total allocation method, wherein the percent to total allocation method specifies reading a subset of warehouse inventory data that represents an availability of the item in the source warehouse, and (ii) a historical allocation method, wherein the historical allocation method specifies reading a subset of warehouse inventory data that records shipments of the item from the destination warehouse;

reading, from a data structure, the subset of warehouse inventory data specified by the selected allocation method;

for each type in the multiple types:

i) generating an allocation ratio by determining a contribution of the type to the subset of warehouse inventory data specified by the selected allocation method;

ii) generating an allocation quantity by applying the allocation ratio to the quantity of the item from the request; and controlling reallocation of the item from the source warehouse to the destination warehouse based on the allocation quantity for each of the multiple types, where the controlling comprises:

transmitting an electronic communication to cause (i) allocation of a first quantity of a first type of the multiple types to a shipment based on a first allocation quantity specified for the first type of the item and (ii) allocation of a second quantity of a second type of the multiple types to the shipment based on a second allocation quantity specified for the second type of the item.

9. The computing system of claim 8, where the item is sold in multiple sizes and color combinations corresponding to respective stock keeping units (SKUs) and further where each unique type corresponds to a unique SKU.

10. The computing system of claim 8 when the selected allocation method comprises percent to total, wherein:

generating the allocation ratio comprises generating an availability ratio for the type by determining a contribution of each of the multiple types to the subset of warehouse inventory data that represents the availability of the item in the source warehouse, and generating the allocation quantity comprises generating the allocation quantity for the type by applying the availability ratio for the type to the quantity of the item from the request.

11. The computing system of claim 10, where:

the operations further comprise:

inputting a source selection that selects one or more item inventory statuses; and filtering the subset of warehouse inventory data that represents the availability of the item in the source warehouse based on the source selection, and generating the availability ratio comprises generating the availability ratio by determining a contribution of each of the multiple types to the filtered subset of warehouse inventory data that represents the availability of the item in the source warehouse.

12. The computing system of claim 11, where the item inventory statuses include one or more of stock on hand or receipt pending based on a purchase order.

13. The computing system of claim 8 when the selected allocation method comprises historical, wherein:

generating the allocation ratio comprises generating a shipment ratio for the type by determining a contribution of the type to the subset of warehouse inventory data that records shipments of the item from the destination warehouse, and generating the allocation quantity comprises generating the allocation quantity for the type by applying the shipment ratio for the type to the quantity of the item from the request.

14. A computer-implemented method comprising, with a processor:

in response to receiving a request for reallocation of an item from a source warehouse to a destination warehouse, automatically parsing, by the processor, the request to identify a quantity of the item from the request, where the item is sold in multiple types;

selecting, by the processor, an allocation method from either of
  (i) a percent to total allocation method, wherein the percent to total allocation method specifies reading a subset of warehouse inventory data that represents an availability of the item in the source warehouse, and
  (ii) a historical allocation method, wherein the historical allocation method specifies reading a subset of warehouse inventory data that records shipments of the item from the destination warehouse;
reading, by the processor, an electronic data structure that stores the subset of warehouse inventory data specified by the selected allocation method;
for each type in the multiple types:
  i) generating, by the processor, an allocation ratio by determining a contribution of the type of the item to the subset of warehouse inventory data specified by the selected allocation method;
  ii) generating, by the processor, an allocation quantity of the type of the item by applying the allocation ratio to the quantity of the item from the request; and
controlling, by the processor, reallocation of the item from the source warehouse to the destination warehouse based on the allocation quantity for each of the multiple types, where the controlling comprises:
  transmitting, by the processor, an electronic communication to cause (i) allocation of a first quantity of a first type of the multiple types to a shipment based on a first allocation quantity specified for the first type of the item and (ii) allocation of a second quantity of a second type of the multiple types to the shipment based on a second allocation quantity specified for the second type of the item.

15. The computer-implemented method of claim 14, where the item is sold in multiple stock keeping units (SKUs) corresponding to size and color combinations and where each unique SKU corresponds to a unique type.

16. The computer-implemented method of claim 14 when the selected allocation method comprises percent to total, wherein:
  generating the allocation ratio comprises generating an availability ratio for the type by determining a contribution of each of the multiple types to the subset of warehouse inventory data that represents the availability of the item in the source warehouse; and
  generating the allocation quantity comprises generating the allocation quantity for the type by applying the availability ratio for the type to the quantity of the item from the request.

17. The computer-implemented method of claim 16, where:
  the method further comprises:
    inputting a source selection that selects one or more item inventory statuses; and
    filtering the subset of warehouse inventory data that represents the availability of the item in the source warehouse based on the source selection, and
  generating the availability ratio comprises generating the availability ratio by determining a contribution of each of the multiple types to the filtered subset of warehouse inventory data that represents the availability of the item in the source warehouse.

18. The computer-implemented method of claim 17, where the item inventory statuses include one or more of stock on hand or receipt pending based on a purchase order.

19. The computer-implemented method of claim 14 when the selected allocation method comprises historical, wherein:
  generating the allocation ratio comprises generating a shipment ratio for the type by determining a contribution of the type to the subset of warehouse inventory data that records shipments of the item from the destination warehouse, and
  generating the allocation quantity comprises generating the allocation quantity for the type by applying the shipment ratio for the type to the quantity of the item from the request.

20. The computer-implemented method of claim 14, where reading the electronic data structure comprises reading, in real time, the electronic data structure that stores the subset of warehouse inventory data specified by the selected allocation method to provide the allocation quantities on demand.

* * * * *

UNITED STATES PATENT AND TRADEMARK OFFICE
CERTIFICATE OF CORRECTION

PATENT NO. : 10,296,858 B2
APPLICATION NO. : 14/626956
DATED : May 21, 2019
INVENTOR(S) : Acuna et al.

Page 1 of 1

It is certified that error appears in the above-identified patent and that said Letters Patent is hereby corrected as shown below:

In the Claims

In Column 11, Line 24, Claim 5, delete "or-receipt" and insert -- or receipt --, therefor.

Signed and Sealed this
Twenty-first Day of July, 2020

Andrei Iancu
*Director of the United States Patent and Trademark Office*